L. LARSEN.
CORN HARVESTER.
APPLICATION FILED NOV. 4, 1912.

1,110,801.

Patented Sept. 15, 1914.

5 SHEETS—SHEET 1.

Witnesses:
E. C. Skinkle
Geo. Knutson

Inventor:
Louis Larsen
By his Attorneys,
Williamson Merchant

L. LARSEN.
CORN HARVESTER.
APPLICATION FILED NOV. 4, 1912.

1,110,801.

Patented Sept. 15, 1914.
5 SHEETS—SHEET 3.

Witnesses:
E. C. Skinkle
Geo. Knutson

Inventor:
Louis Larsen.
By his Attorneys:
Williamson Merchant

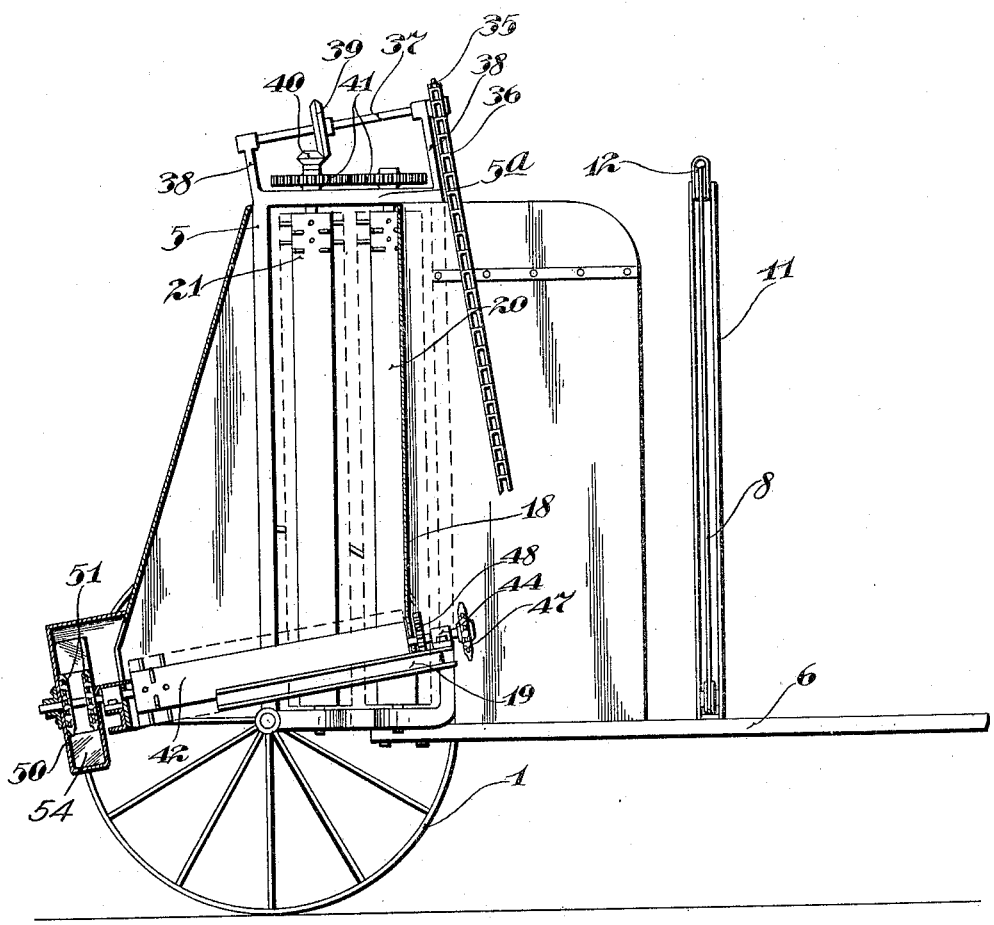

L. LARSEN.
CORN HARVESTER.
APPLICATION FILED NOV. 4, 1912.
1,110,801.
Patented Sept. 15, 1914.
5 SHEETS—SHEET 5.
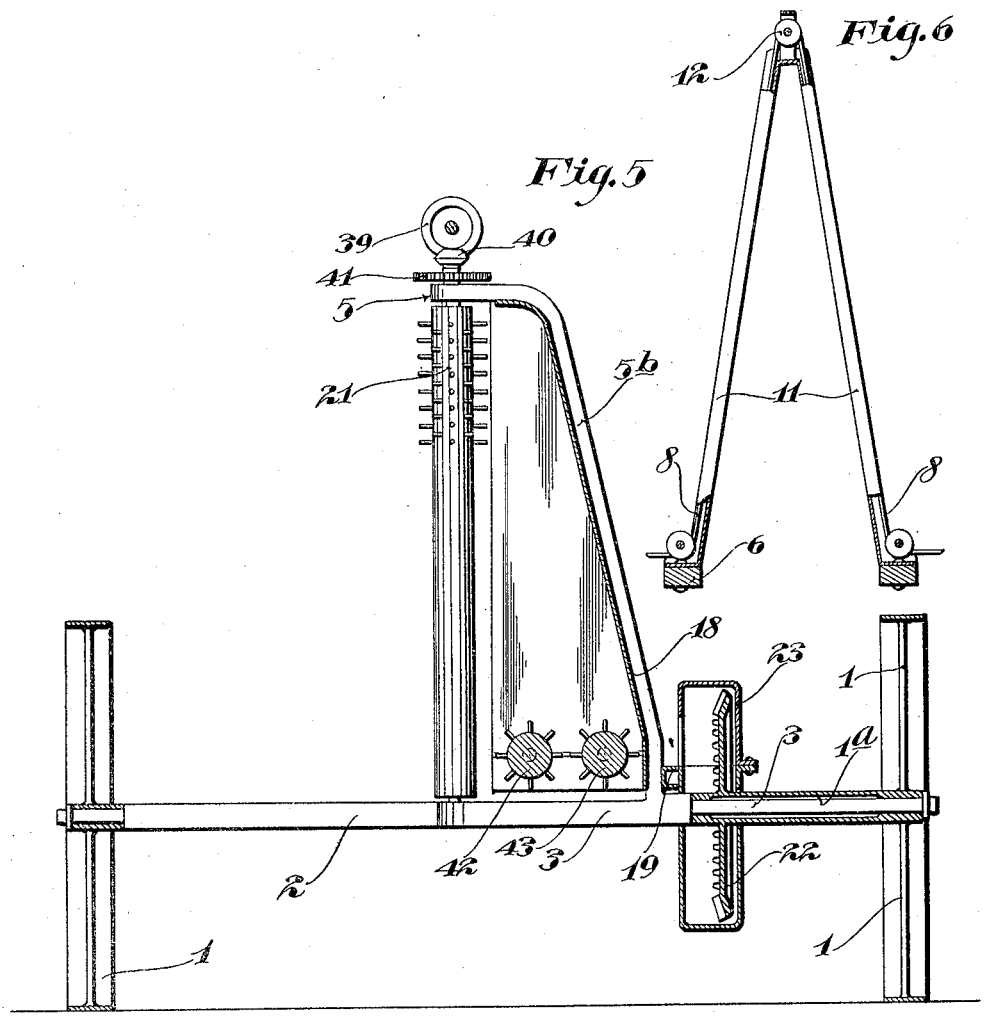
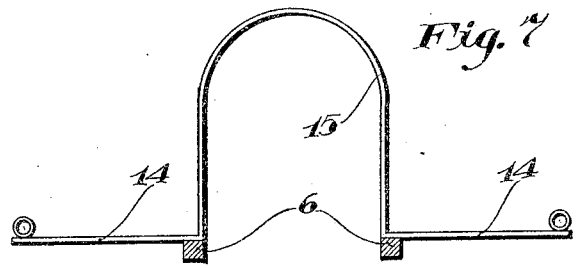
Witnesses:
E. C. Skinkle
Geo. Knutson
Inventor:
Louis Larsen
By his Attorneys,
Williamson Merchant

UNITED STATES PATENT OFFICE.

LOUIS LARSEN, OF LAMBERTSON, MINNESOTA.

CORN-HARVESTER.

1,110,801.  Specification of Letters Patent.  Patented Sept. 15, 1914.

Application filed November 4, 1912. Serial No. 729,317.

*To all whom it may concern:*

Be it known that I, LOUIS LARSEN, a citizen of the United States, residing at Lambertson, in the county of Redwood and State of Minnesota, have invented certain new and useful Improvements in Corn-Harvesters; and I do hereby declare the following to be a full, clear, and exact description of the invention, such as will enable others skilled in the art to which it appertains to make and use the same.

My invention has for its object to provide an extremely simple and highly efficient corn harvester, and to such ends, the invention consists of the novel devices and combinations of devices hereinafter described and defined in the claims.

The invention is illustrated in the accompanying drawings, wherein like characters indicate like parts throughout the several views.

Figure 1:
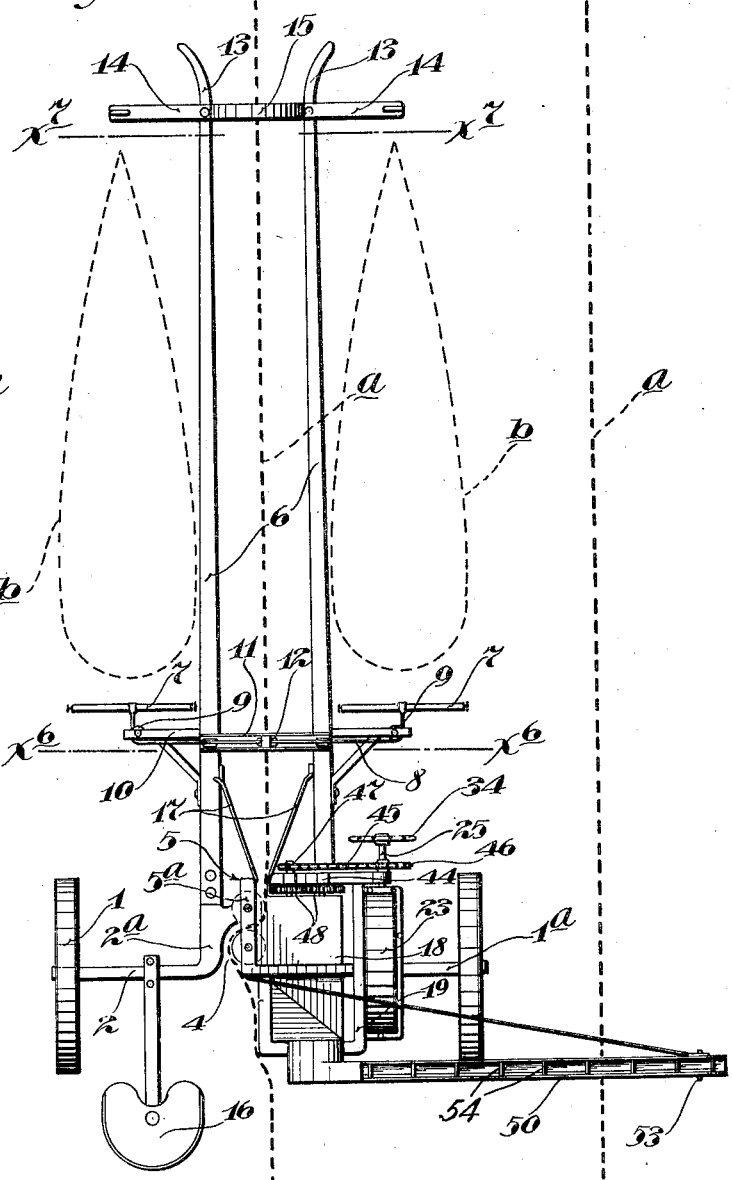
Figure 2:
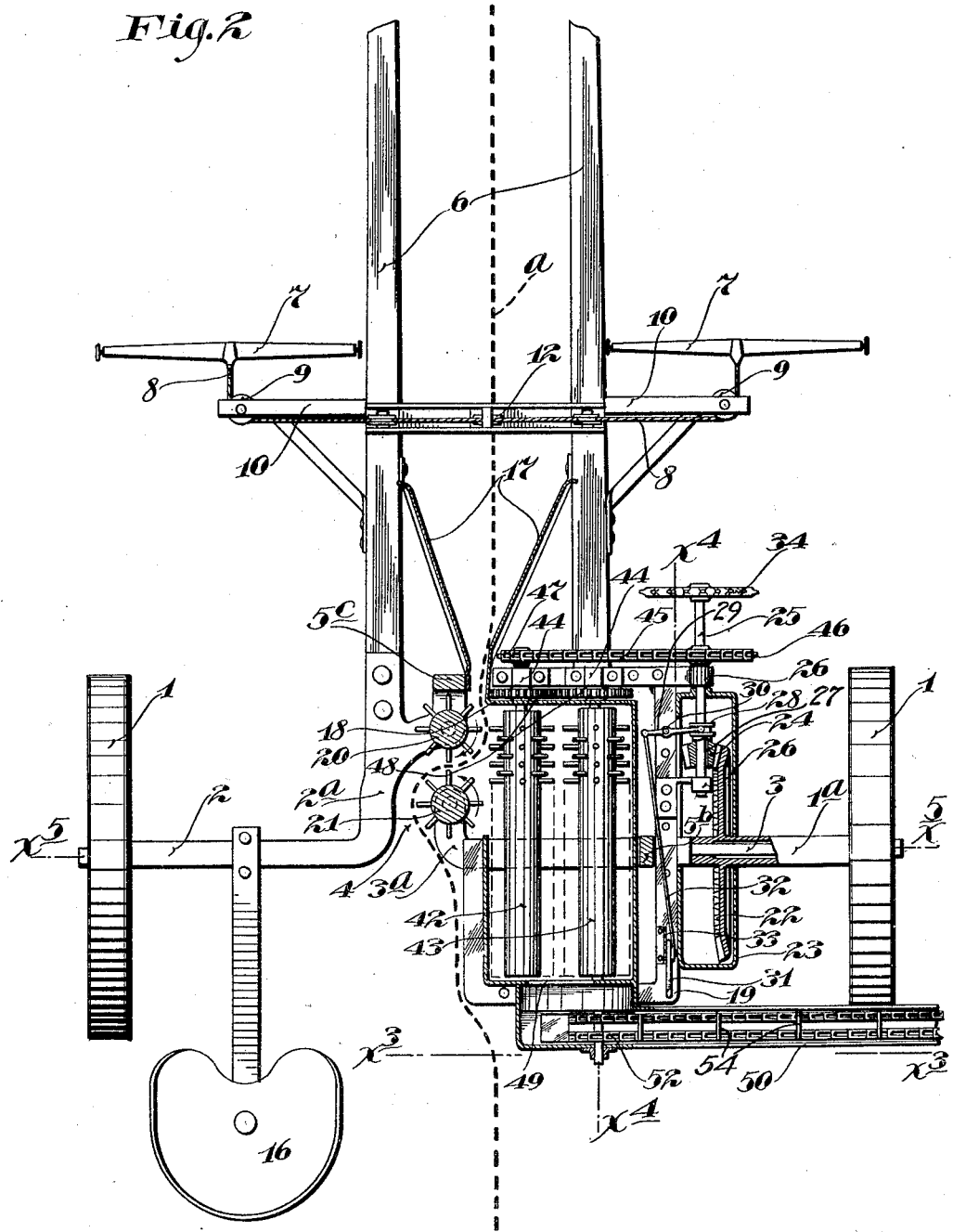
Figure 3:
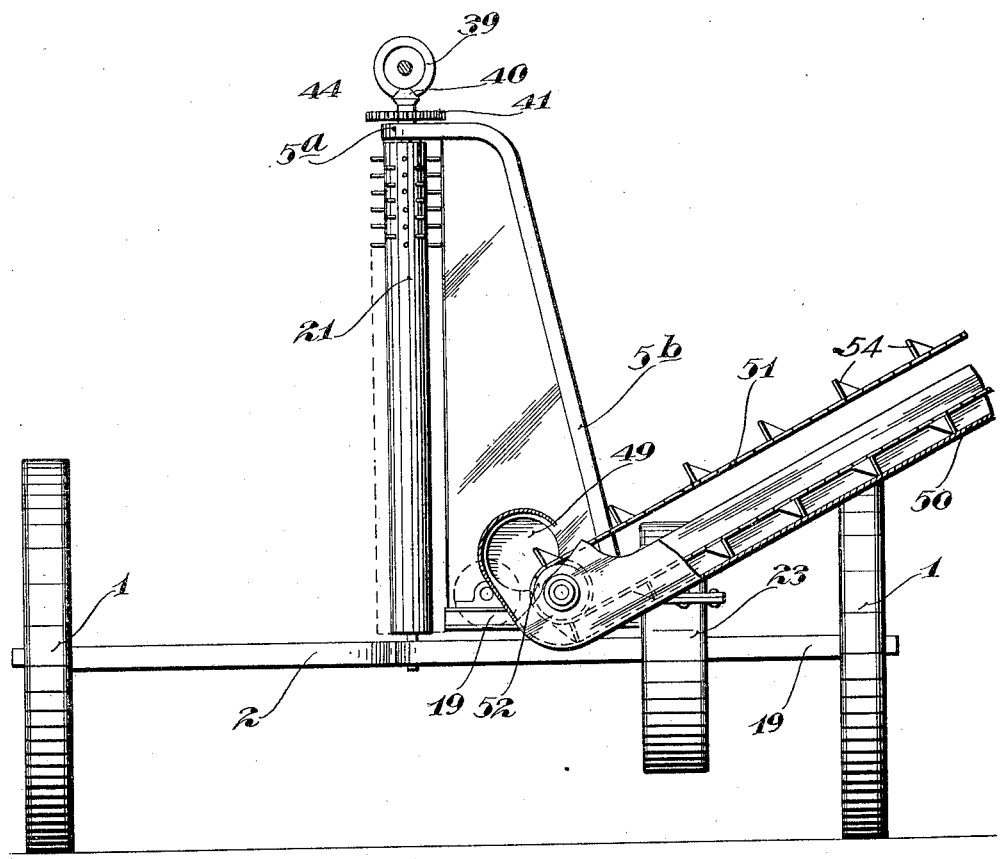

Referring to the drawings: Figure 1 is a plan view of the improved harvester; Fig. 2 is a view corresponding to Fig. 1, on an enlarged scale, with some parts broken away, and with some of the exposed parts shown in horizontal section; Fig. 3 is a rear end elevation of the improved harvester with some parts sectioned on the line $x^3$ $x^3$ of Fig. 2; Fig. 4 is a view principally in vertical section, taken on the irregular line $x^4$ $x^4$ of Fig. 2; some parts being broken away and some of the exposed parts being shown in section; Fig. 5 is a vertical section taken on the line $x^5$ $x^5$ of Fig. 2; Fig. 6 is a vertical section taken on the line $x^6$ $x^6$ of Fig. 1; and Fig. 7 is a view, principally in vertical section, taken on the line $x^7$ $x^7$ of Fig 1.

The numeral 1 indicates a pair of traction wheels loosely journaled on a two-part axle, the sections of which are indicated by the numerals 2 and 3. To permit the machine to travel over a row of corn stalks, with the traction wheels 1 running outside thereof, the axle sections 2 and 3 are separated to form a passageway 4, through which the corn stalks pass during the advance movement of the machine. These two axle sections 2 and 3 are permanently and rigidly connected by an arch structure 5 of sufficient height to permit the corn stalks to pass thereunder, without bending the same. As best shown in Fig. 1, the intermediate or horizontal portion $5^a$ of the arch structure 5 extends transversely of the axle sections 2 and 3, and the legs of the arch structure are indicated by the characters $5^b$ and $5^c$. The leg $5^b$ directly overlies the inner end portion of the axle section 3 and connects the rear end of the transverse portion $5^a$ with the intermediate portion of the axle section 3. The leg $5^c$ extends vertically downward from the front end of the transverse portion $5^a$ and its lower end is connected to a forwardly and laterally projecting extension $2^a$ on the axle section 2.

Rigidly secured to the extension $2^a$ of the axle section 2 and to the axle section 3 is a pair of laterally spaced draft poles 6, arranged to embrace a row of corn stalks $a$. In Fig 1 three rows of corn stalks $a$ are indicated by dotted lines. To indicate the positions of the draft animals with respect to the poles 6, their outlines have been indicated, in Fig. 1, by means of dotted lines $b$. The draft animals are hitched to the poles 6 by means of a pair of whiffle trees 7, connected flexibly, as by a chain or cable 8. The outer end portions of the connection 8 run over a pair of guide sheaves 9, loosely journaled, each in a horizontal outwardly projecting bracket extension 10, secured to the poles 6. To carry the intermediate portion of the connection 8 over the row of corn stalks embraced by the poles 6, an arched channel bar 11 is rigidly secured at its ends to the poles 6, as best shown in Fig. 6. Loosely journaled at the ends and intermediate portion of the arched bar 11 are three guide sheaves 12, over which the intermediate portion of the connection 8 works. At their forward ends, the poles 6 are outwardly and reversely curved at 13, for the purpose of gathering the corn stalks between the poles 6 under the advance movement of the machine. A neck yoke 14, to which the draft animals are attached, is rigidly connected to the forward ends of the poles 6, just to the rear of their curved ends 13, and its intermediate portion is bent upward to form an arch 15. Obviously, the neck yoke arch 15 and the arch bar 11 permit the machine to be driven over a row of corn stalks without bending or breaking the same. To the axle section 2 is rigidly secured an operator's seat 16.

Located between the draft device and the axle of the machine is a pair of rearwardly converging gathering plates 17. The front edges of these gathering plates 17 are rigidly secured, one to each of the poles 6 and their throat or contracted portion is arranged to deliver the corn stalks to the passage 4 through the axle sections 2 and 3. The rear edge portion of one of the gathering plates 17 is rigidly secured to the leg 5ᶜ of the arch structure 5, and the rear edge portion of the other of said gathering plates 17 terminates in a housing 18, rigidly secured to the leg 5ᵇ of the arch structure 5 and to a substantially horizontally extended frame 19, constructed from a channel bar secured to the axle section 3.

A pair of upright coöperating snapping rollers 20 and 21 are mounted one on each side of the passage 4, located one in advance of the other, so that the corn stalks, in passing through the passage-way 4, are bent laterally as the same are moved through the snapping rollers 20 and 21, as best shown in Fig. 1. The upper ends of both of the snapping rollers 20 and 21 are loosely journaled in the intermediate bar 5ᵃ of the arch structure 5, and the lower ends of the snapping rollers 20 and 21 are loosely journaled, one in the axle extension 2ᵃ and the other in a forward extension 3ᵃ of the axle section 3.

For driving the snapping rollers 20 and 21 from one of the traction wheels 1, the following connections are provided. The traction wheel 1, which is journaled on the axle section 3, is provided with a long inwardly projecting hub extension 1ᵃ, having integrally formed thereon a large bevel gear 22, that is mounted within a gear casing 23, secured to the frame 19. Meshing with the gear 22 is a bevel pinion 24, slidably mounted on a horizontally extended shaft 25, journaled in a pair of bearings 26, on the frame 19. The pinion 24 is held for rotation with the shaft 25 but with freedom for sliding movement thereon by a key 27, and is provided with a flanged collar 28. For sliding the collar 28 on the shaft 25, to move the pinion 24 into and out of engagement with the gear 22, a shipper lever 29 is intermediately pivoted at 30 to the frame 19. One end of this shipper lever 29 extends between the flanges of the collar 28 and its other end is connected to an operating lever 31 by a link 32. The lever 31 is pivotally secured to a coöperating lock segment 33, secured on the frame 19. On the shaft 25, outward of the gear casing 23, is keyed or otherwise secured a sprocket wheel 34, over which and a relatively small sprocket wheel 35 runs a sprocket chain 36. This sprocket wheel 35 is rigidly secured to a counter shaft 37, loosely journaled in bearings 38, on the intermediate portion 5ᵃ of the arch structure 5. Also keyed or otherwise secured to the shaft 37 is a bevel gear 39, that meshes with a bevel pinion 40, keyed or otherwise secured to the upper end of the shaft of the snapping roller 21. The snapping roller 20 is driven from the snapping roller 21 and in a reverse direction therefrom by a pair of intermeshing spur gears 41, keyed or otherwise secured to the upper ends of the shafts of the said two snapping rollers.

A pair of husking rollers 42 and 43 are arranged to receive the ears of corn as the same are broken from the corn stalks by the snapping rollers 20 and 21. These husking rollers 42 and 43 are located at the bottom of the housing 18, just above the axle section 3, extend transversely of and at one side of the snapping rollers 20 and 21, and are journaled in bearings 44, secured to the frame 19. The husking roller 42 is driven from the shaft 25 by a sprocket chain 45, which runs over a relatively large sprocket wheel 46 on the shaft 25, and a relatively small sprocket wheel 47 on the shaft of the husking roller 42. For driving the husking roller 43 from the husking roller 42 and in a reverse direction thereto, a pair of intermeshing spur gears 48 is secured to the shafts of said rollers.

By reference to Fig. 4, it will be noted that the husking rollers 42 and 43 are inclined slightly rearwardly, so as to deliver the husked ears of corn through an opening 49 in the housing 18, to the lower end of an inclined elevator leg 50. Within this elevator leg 50 is mounted a pair of parallel chains 51, arranged to run over a pair of sprocket wheels 52, keyed or otherwise secured to the rearwardly projecting end of the shaft of the husking roller 43 and a pair of idle sprocket wheels 53, loosely journaled in the upper end of the elevator leg 50. Secured to the chains 51 is a multiplicity of lifting flights 54, arranged to carry the ears of corn upward through the elevator leg 50, as they are delivered through the opening 49, and deliver the same out of the upper end thereof into a wagon, that is driven between the rows of corn stalks beside the corn harvester.

What I claim is:

1. In a corn harvester, the combination with coöperating snapping rollers, set, one completely in advance of the other and in a vertical plane parallel to the direction of travel of the machine, of husking rollers arranged to receive from said snapping rollers, and gathering plates arranged to deliver corn stalks between said snapping rollers.

2. In a corn harvester, the combination with an axle, having an arch section, of coöperating snapping rollers, journaled bodily within said arch section, husking rollers arranged to receive from said snapping rollers, and gathering plates arranged to deliver corn stalks between said snapping rollers.

3. In a corn harvester, the combination with an axle, having an arch section, of coöperating snapping rollers, journaled in said arch section, set, one completely in advance of the other and in a vertical plane parallel to the direction of travel of the machine, husking rollers arranged to receive from said snapping rollers, and gathering plates arranged to deliver corn stalks between said snapping rollers.

In testimony whereof I affix my signature in presence of two witnesses.

LOUIS LARSEN.

Witnesses:
 FRED WOG,
 MAGDALENA PECHTL.

Copies of this patent may be obtained for five cents each, by addressing the "Commissioner of Patents, Washington, D. C."